Oct. 3, 1944. W. L. McNAMARA 2,359,433
TRANSFERRING MACHINERY
Filed Sept. 20, 1941 5 Sheets-Sheet 1

INVENTOR.
William L. McNamara
BY Norman N. Holland
ATTORNEY

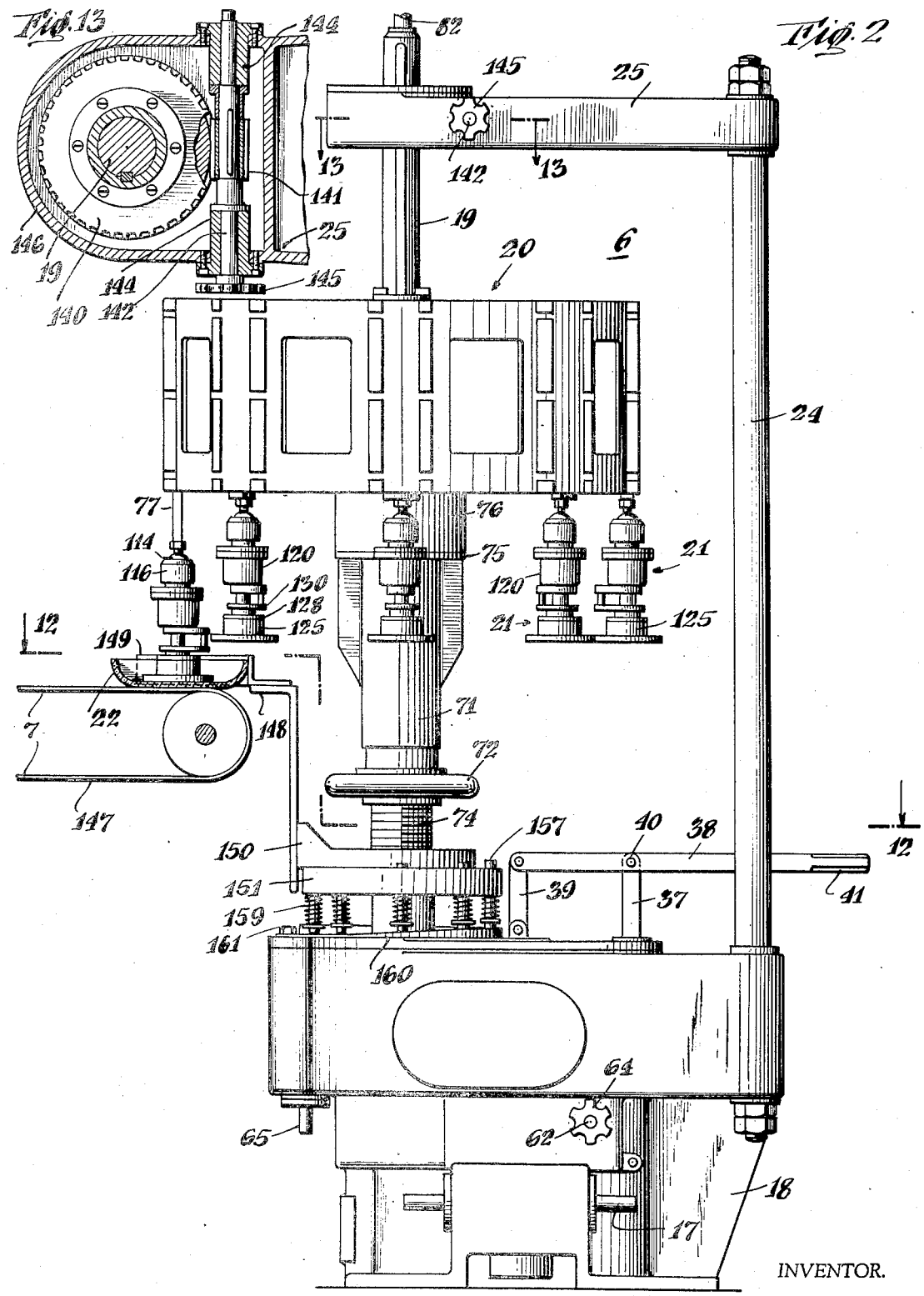

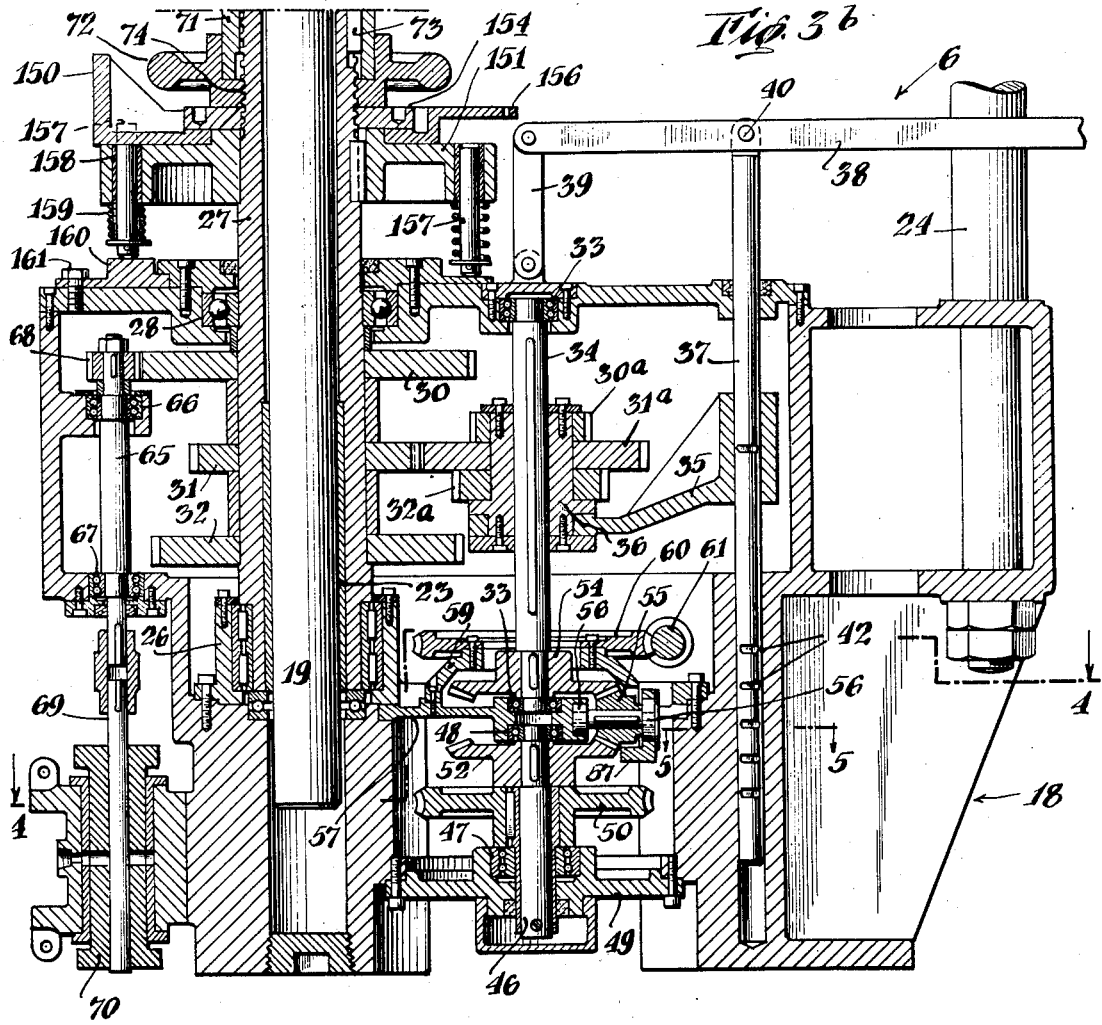

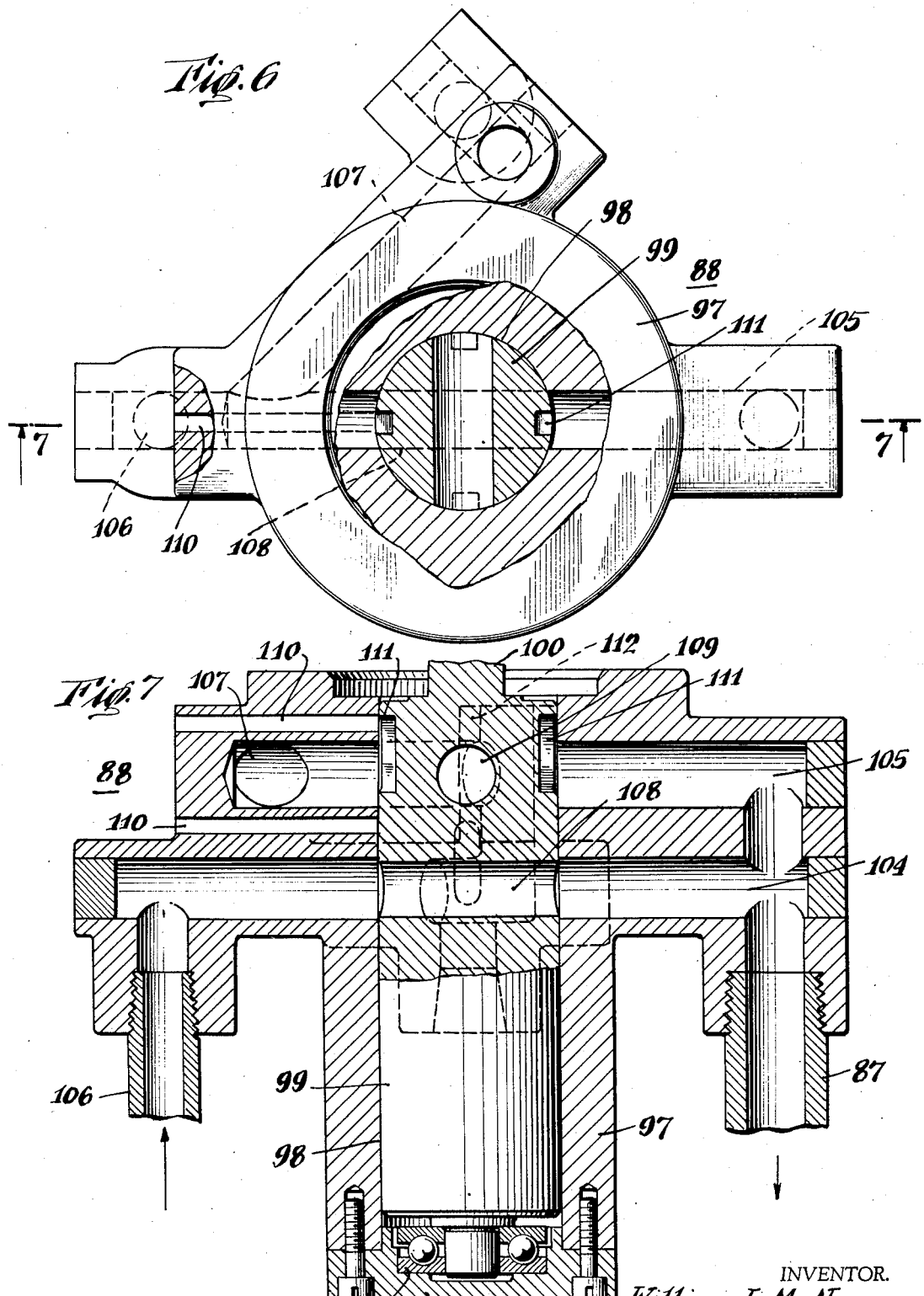

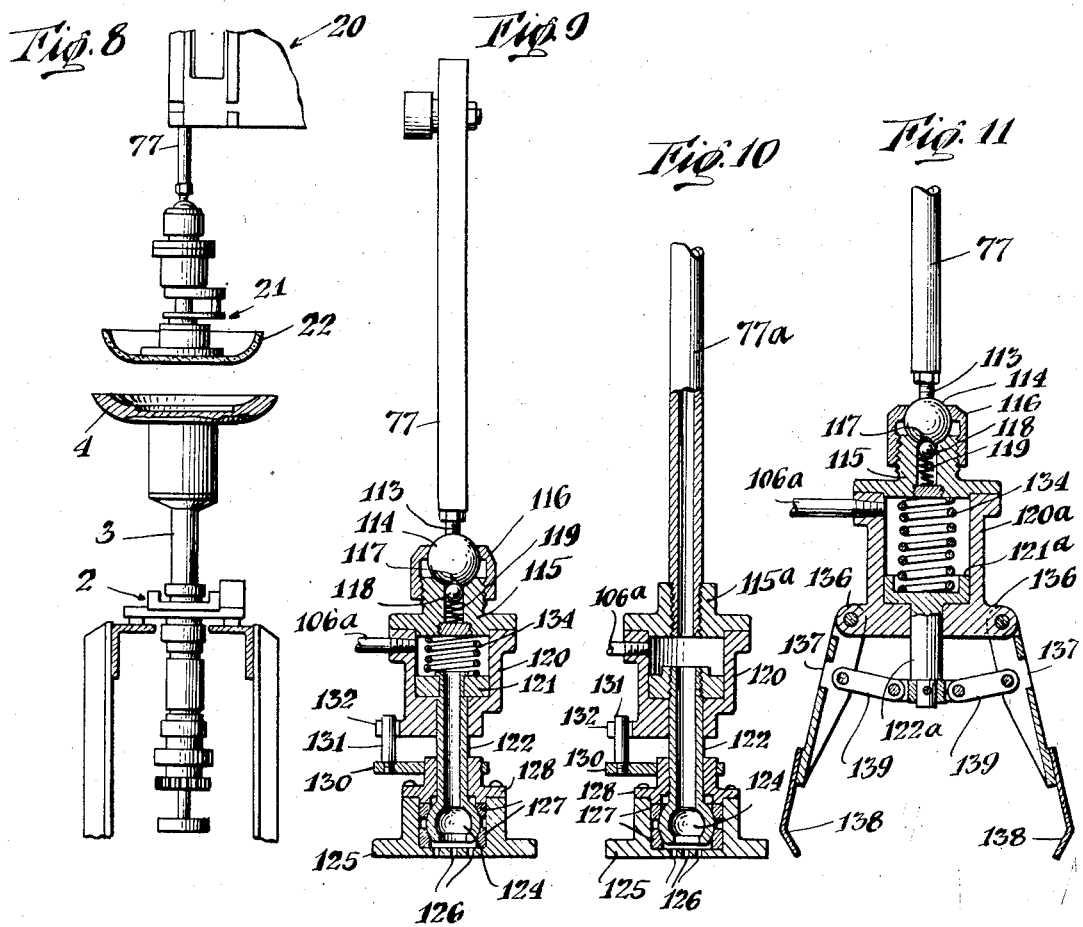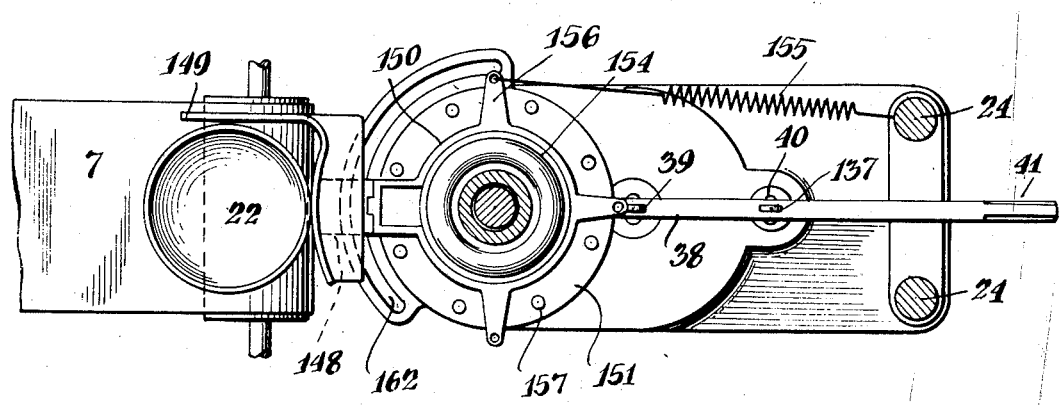

Patented Oct. 3, 1944

2,359,433

UNITED STATES PATENT OFFICE 2,359,433

TRANSFERRING MACHINERY

William L. McNamara, Lancaster, Ohio, assignor to Anchor Hocking Glass Corporation, Lancaster, Ohio, a corporation of Delaware Application September 20, 1941, Serial No. 411,716

22 Claims. (Cl. 198—25)

The present invention relates to transferring devices and more particularly to devices for transferring glassware and the like.

Glassware, at the present time, is sold in large quantities at low cost. Hand operations and skilled labor must be eliminated or minimized wherever possible in order for the manufacture of the ware to be profitable. A persistent problem is the transfer of the molded glassware from one machine to another. Generally, the ware is delivered from a mold or fabricating machine to a conveyor and from the conveyor to an annealing lehr which anneals the ware to eliminate strains therein and breakage resulting therefrom. In many cases the ware has to be glazed, which requires subjecting the rim to a flame to remelt and smooth the edge thereof. In such cases, the ware leaving the fabricating machine must be delivered to and removed from the glazing machine. Manually transferring the ware to and from the machines would materially increase the cost thereof. Because of the substantial saving in automatically transferring glassware and because of the difficulty encountered in so doing, a number of transfer devices have been devised. Among the problems encountered are the breakage of glassware due to its fragile nature, the removal of the ware from molds or other enveloping or partially enveloping supports, and the handling with a single machine of the various sizes and shapes of ware. The present invention is an improvement upon existing machines in many respects. It is particularly applicable to handling various sizes and shapes of ware and in removing the ware from pockets without breakage and without requiring intermittent operation of the machines. However, the machines may be intermittently operated, if desired. The device is particularly adapted to engage the upper side of the bottom of the ware which in most cases is flat or reasonably so, thereby facilitating supporting the ware with a suction holder. In addition, the device effectively removes ware from pockets without permitting it to contact with the sides of the pockets or with other obstructions to lateral movement.

The present invention aims to provide a transfer device which is applicable to various sizes and shapes of ware and adapted to remove it from, and deliver it to various types of supports without breakage. The invention aims further to provide an improved transfer device which is simple in construction and which may be readily operated with little or no attention from an attendant.

An object of the present invention is to provide an improved device for transferring glassware and similar articles.

Another object of the invention is to provide a simple device for transferring articles such as glassware from one position to another.

Another object of the invention is to provide an improved transferring device which will quickly raise an article out of a pocket or mold to permit lateral transfer thereof.

Another object of the invention is to provide a device responsive to contact with an article for automatically raising the article immediately upon engagement therewith.

Another object of the invention is to provide a suction holder supported by a device adapted to move the holder upwardly immediately that it engages an article.

Another object of the invention is to provide improved means for accurately positioning an article on a conveyor to facilitate engagement of the article by a transfer device.

Another object of the invention is to provide a simple and effective means for synchronizing a transfer device with respect to a machine for receiving or delivering articles.

Another object of the invention is to provide improved means for adjusting the phase relation between a transfer device and a machine delivering articles thereto or receiving articles therefrom.

Another object of the invention is to provide an improved transfer device adapted to accommodate a greater range of sizes and shapes of ware.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a schematic top plan view of the present invention utilized in delivering glassware to and removing it from a glazing machine;

Fig. 2 is a side elevational view of a preferred embodiment of the transfer device;

Fig. 3a is a vertical sectional view through the upper part of the transfer device and Fig. 3b is a continuation of Fig. 3a showing a vertical sectional view through the lower part of the machine; Figs. 3a and 3b are shown separately in order to permit ample enlargement.

Fig. 4 is a sectional view along the line 4—4 of Fig. 3b illustrating features of the driving mechanism;

Fig. 5 is a sectional view along the line 5—5 of

Fig. 3b, illustrating the holding means for the clutch;

Fig. 6 is an enlarged horizontal sectional view through a valve for subjecting the vessel engaging means to suction and atmosphere;

Fig. 7 is a vertical sectional view along the line 7—7 of Fig. 6;

Fig. 8 is a sectional view illustrating the removal of a dish from a holder on a glazing machine;

Fig. 9 is an enlarged sectional view through the preferred embodiment of vessel engaging means;

Fig. 10 is an enlarged sectional view through another embodiment of vessel engaging means;

Fig. 11 is an enlarged sectional view through another embodiment of vessel engaging means;

Fig. 12 is a sectional view along the line 12—12 of Fig. 2 illustrating the means for positioning articles on a moving conveyor; and Fig. 13 is a sectional view along the line 13—13 of Fig. 2, illustrating the means for adjusting the stationary cam with respect to the turret.

Figure 1:
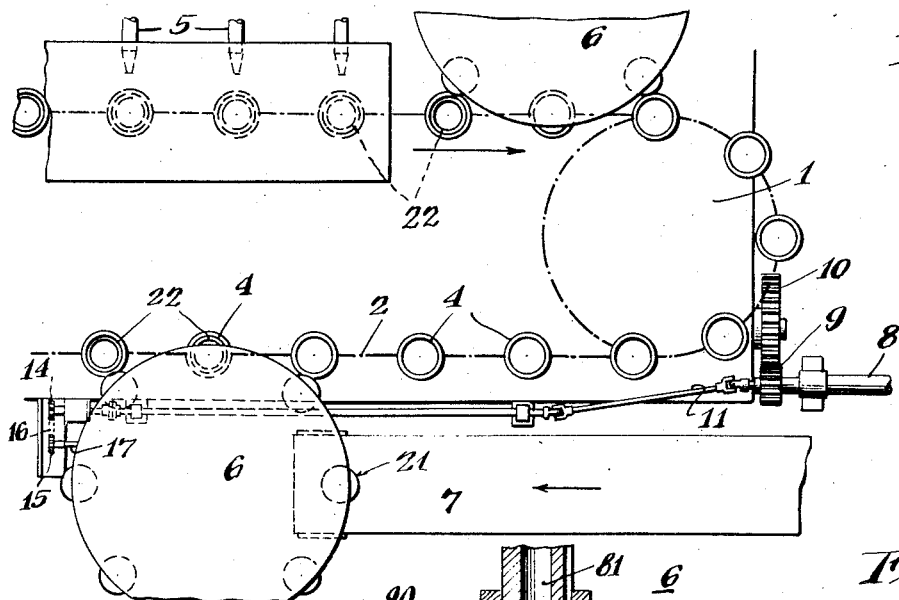

Referring again to the drawings, and more particularly to Fig. 1 thereof, a preferred embodiment of the invention is illustrated delivering glassware to and removing it from a glazer 1. The glazer is illustrative of the general application of the invention to any type of machine, conveyor or support. The details of the glazer are not illustrated herein as they are not a part of the invention but such a machine generally consists of a conveyor 2 having holders 3 for retaining supports 4 on which articles such as glassware may be placed. A sectional view of one form of glazer conveyor is shown in Fig. 8. The articles are conveyed past a series of burners 5 which apply sufficient heat to the rims of the articles to remelt them and eliminate any sharp edges or projections. A transferring device 6 is shown receiving ware from a conveyor 7 and loading it on the glazer. A second transferring mechanism is shown removing the ware after it has been fire polished by the glazer. It will be understood that the relative positions of the glazer 7 and the transferring devices 6 are intended to be illustrative and that they may be changed to various other positions depending upon the plant layout and the interconnecting machinery.

While any suitable source of power may be utilized, it is desired to have the glazer and the transferring device timed with respect to each other which is preferably accomplished by utilizing the same drive. As illustrated in Fig. 1 the main drive shaft 8 is operatively connected to drive the glazer 1 through gears 9 and 10 and is operatively connected to drive the transfer device 6 through shafts 11 and 12, sprockets 14 and 15, chain 16, and shaft 17 leading to the transfer device. The glazer is frequently required to fire polish ware varying greatly in size. For example, in one instance, the ware may be a very small dish and in another it may be a large dish. The accommodation of different size ware is usually accomplished by having the holders 3 relatively close together so that with small ware a support 4 may be placed on each holder 3. With larger ware, a support is attached to every second holder. With still larger ware, a support may be attached only to each third holder. Thus, the transfer device may be required to deliver ware to each holder, each second holder or each third holder on the glazer depending upon the size of the ware. One way of achieving this result is to change the relative sizes of the sprockets 14 and 15. Another mechanism is provided within the drive of the transfer device for accomplishing the same results and will be described hereinafter.

Described generally and referring more particularly to Fig. 2 of the drawings, the transfer device 6 comprises a base 18 adapted to house the driving gears and adapted to support a vertical shaft 19. A turret 20 is mounted about the vertical shaft and carries a plurality of suction heads 21 which are adapted to engage articles, such as the dish 22 delivered by a conveyor 7, raise them from the conveyor, transfer them to another suitable position, and lower them onto another conveyor or support. A pair of vertical rods 24 extend upwardly from the base of the transfer device and are connected by a cross brace 25 to the vertical shaft 19 in order to reinforce the latter.

Figure 3A:
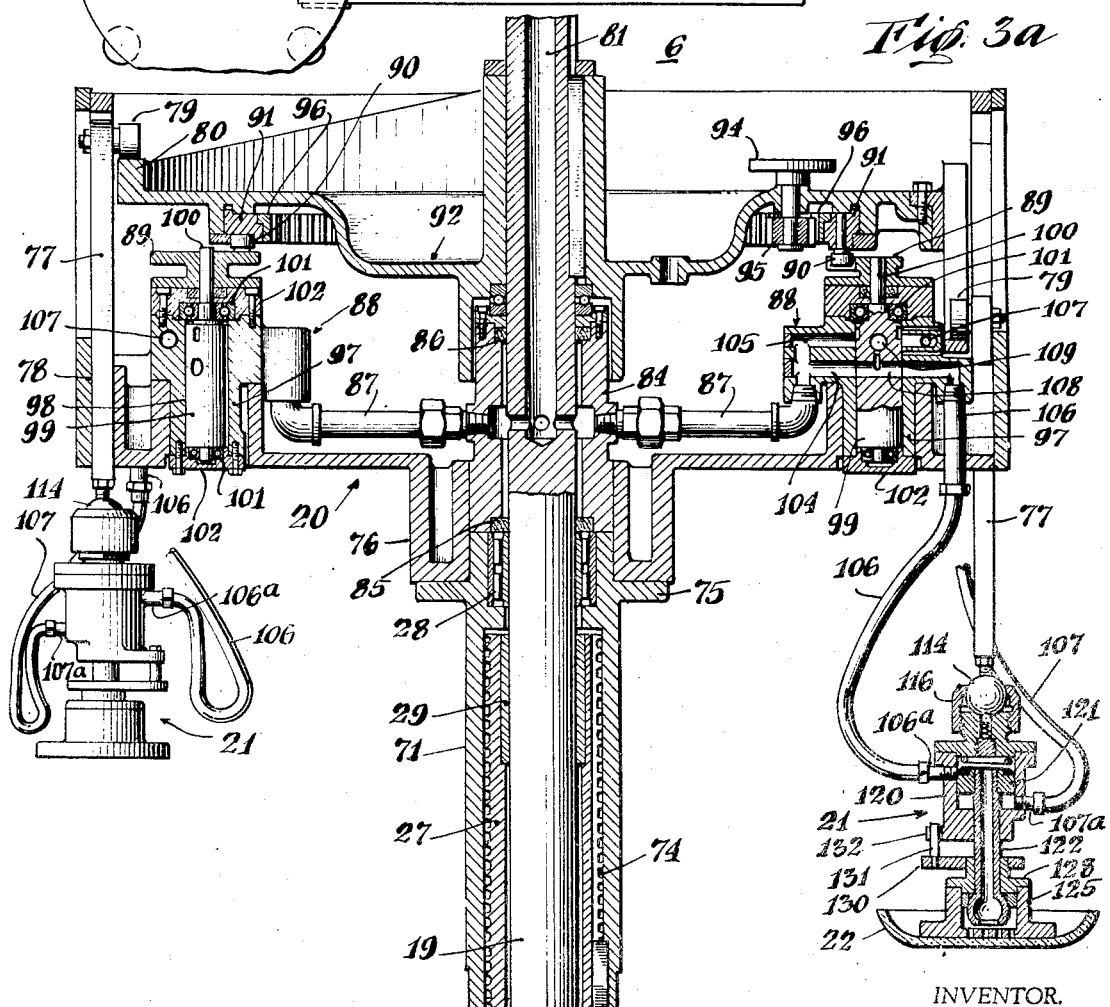

The construction of the preferred embodiment of the transfer device 6 is shown in the vertical cross-sectional view illustrated in Figs. 3a and 3b. Referring more particularly to Fig. 3b showing the drive, the base 18 has a bearing 26 extending about the vertical shaft 19 and rotatably supporting the lower end of a hollow column or shaft 27. A bushing or bearing 23 is provided at the lower end of the hollow column 27 for rotatably holding the hollow column 27 about the shaft 19. A second bearing 28 is provided about the hollow member 27 at the upper part of the base 18. A bushing or bearing 29 is interposed between the upper end of the member 27 (Fig. 3a) and the shaft 19. Thus, the hollow member 27 is free to rotate about the vertical supporting shaft 19. For the purpose of rotating the hollow member 27, there are keyed to it three gears 30, 31 and 32 of different sizes separated by suitable bushings. These gears are driven by clutch gears 30a, 31a, and 32a, which are slidably keyed to shaft 34, mounted in bearings 33. A bracket 35 having a hub 36 at one end, carrying gears 30a, 31a and 32a, is rigidly fixed at its other end to clutch rod 37. The rod 37, together with the bracket 35 is adapted to be moved vertically by means of the clutch lever 38 pivoted at one end to a support 39 and operatively connected at 40 to the clutch rod 37. By raising and lowering the opposite end of the handle 41 of the clutch lever, the clutch gears 30a, 31a and 32a may be made to mesh selectively with gears 30, 31 and 32, respectively, on the hollow drive member 27. The clutch affords three predetermined speeds for rotating the member 27 which carries and rotates the turret 20. Preferably the sizes of the gears are chosen so that at high speed the suction heads 21 will be synchronized with each holder 3 on the glazer, at the intermediate speed, with each second holder and, at the lowest speed, with each third holder. This, as pointed out above, permits a wide range in the sizes of ware to be glazed, by adjusting the clutch and by changing the size of the supports on the holders 3 of the glazer conveyor.

In order to retain the clutch is proper position, there is provided on the clutch rod 37 a series of notches 42 on the respective sides thereof (Figs. 3b and 5). In the housing of the base 18 about the rod 37 are a series of balls 44 held in position by springs 45 adapted to engage these notches 42 and hold the rod 37 resiliently in selected positions. When pressure is applied to the handle 41 of the clutch, the balls 44 will spring out of the notches 42 and permit the clutch to be changed from one position to another.

A second shaft 46 is mounted below and in vertical alignment with the clutch shaft 34 with the ends thereof in bearings 47 and 48. The lower bearing is supported by a plate 49 bolted to the base 18. A gear 50 is keyed to the shaft 46 and meshes with a gear 51 on the drive shaft 17 (Figs. 1 and 4) which is in turn operatively connected to the main drive shaft 8 through sprockets 14 and 15, chain 16 and shafts 11 and 12. A bevel gear 52 (Fig. 3b) is also keyed to shaft 46 and is adapted to drive the bevel gear 54, keyed to the lower end of clutch shaft 34, through the intermediation of gear 55 rotatably mounted in the bearings 56 carried by a plate 57. Plate 57 is rotatably mounted on the bearings 33 and 48 and is bolted to a plate 59 which is in turn bolted to gear 60. The position of the gear 60 is controlled (Figs. 3b and 4) by a worm gear 61 on shaft 62 operated by a handwheel 64. Thus, by operating the handwheel 64, the gear 60 is rotated by the worm gear 61 which, in turn, rotates the plate 57 and moves the gear 55 with respect to the bevel gears 52 and 54 on the ends of shafts 46 and 34 respectively. As long as the position of the plate 57 and gear 55 are not changed, the gear 55 merely transmits the movement of gear 52 to the gear 54 but when the position of gear 55 is changed the angular relation between the two gears 52 and 54 is changed. In other words, if the bevel gear 52 is kept stationary and the gear 55 moved by operation of the adjusting handle 64, the bevel gear 54 will have to rotate. The rotation of gear 54 will rotate shaft 34 and through the clutch gears 31a and gear 31 on shaft 27 will rotate the turret on the transfer device. In this way, the hand wheel 64 may be utilized to synchronize or register the suction heads 21 accurately with the holders 3 on the glazer conveyor 2.

On the side of the shaft 19 opposite to the drive, there is shown a shaft 65, mounted in bearings 66 and 67, having a gear 68 meshing with gear 30, and operatively connected to a second shaft 69 to rotate a valve member 70 for timing any suitable mechanism with respect to the operation of the transfer mechanism.

For purposes of vertical adjustment of the turret 20 a hollow supporting member 71 extends about the upper end of the member 27, its lower end being supported by a hand wheel 72 adjustably secured to a thread 74 on the exterior of the member 27. By rotation of the hand wheel 72, the member 71 and the turret 20 supported thereon may be raised to any suitable level to correspond to the height of the conveyors or supports with which the transfer device is to be operated. The upper end of the member 71 has a flange 75 (Fig. 3a) adapted to extend beneath and support the central hub 76 of the turret 20. Since the hollow member 71 is slidably keyed to the member 27 at 73, the turret will be rotated with the member 27 when the drive shaft of the transfer device is driven to operate the machine. Thus the suction heads 21 will be rotated with the turret. The suction heads are mounted on rods 77 mounted in guideways 78 and have at their upper ends cam rollers 79 in engagement with a stationary cam 80. The cam 80 is shaped so that the suction heads 21 will be lowered to engage an article which is to be picked up and will be brought to the proper level to deposit the article on the support to which it is to be delivered. For convenience, the central shaft 19 is hollowed at its upper end 81 so that a suitable source of suction 82 (Fig. 2) may be attached at its upper end. A rotatable sleeve 84 extends about the central shaft 19 and is sealed thereto by gaskets 85 and 86 at its respective ends. The sleeve 84 rotates with the turret and has outlets or conduits 87 in communication with the source of suction at the hollowed portion 81 of the shaft 19 to connect the suction heads 21 alternately to vacuum and to atmosphere by means of a star wheel 89 actuated by a pin 90 secured to an adjustable collar 91 on the stationary casting 92. The position of the pins 90 may be simultaneously adjusted by means of a hand wheel 94 having a gear 95 meshing with the gear rack 96 on the inner periphery of the collar 91. Thus the collar 91 which is rotatably mounted may be adjusted so that the vacuum and atmosphere are applied at the proper instants with respect to the operation of the machines delivering and receiving the glassware.

The details of the vacuum control valves 88 are illustrated more particularly in Figs. 3a, 6 and 7. The outer casing 97 has a cylindrical bore or bearing 98 in which a cylindrical valve member 99 is mounted having a stem 100 extending from its upper end and rigidly secured to the star wheel 89. Suitable bearings 101 are secured to the upper and lower ends of the valve member 99 by plates 102 to facilitate rotation. As will be pointed out later, in some instances it may be desirable to attach suction conduits to both ends of the pneumatic cylinders 120 (Fig. 9) for operating the suction head and hence it may be desirable to control two conduits leading from the valves 88. The vacuum conduit 87, at one side of the casing 97, connects with two horizontal bores or conduits 104 and 105 which lead through the central cylindrical bore or bearing 98 to outlets 106 and 107 to be controlled by the valve member 99. When the star wheel rotates the valve member 99, the diametric conduits 108 and 109 therein connect, alternately, the suction conduits 104 and 105 with the outlets 106 and 107, respectively. An atmospheric conduit 110 connects with the outlet 107 through vertical grooves or passageways 111 in the valve member 99. This same atmosphere conduit connects with the suction outlet 106 through vertical grooves 112 in the member 99. Thus, as the star wheel rotates member 99, the conduit 106, leading to the upper end of the cylinder 120, is subjected to vacuum during a portion of each turn of the turret and is closed to vacuum and open to atmosphere during a subsequent portion of the turn, the times of opening and closing can be changed by adjustment of the pins 90 which operate the star wheels 89. Likewise the conduit 107 leading to the lower end of the cylinder 120, is subjected alternately to vacuum and to atmosphere at the desired times. The star wheel, in the preferred embodiment, is rotated one-quarter turn each time it engages one of the members 90.

Referring more particularly to Fig. 9 illustrating the preferred embodiment of suction head for engaging and holding glassware, a ball member 114 is secured to the end of the supporting rod 77 by a threaded projection 113 thereon, and is held in position in the cavity in the upper end of the member 115 by means of a threaded cap 116 forming in effect a ball and socket joint. The lower part of the ball member 114 has a depression 117 therein adapted to receive a holding member 118 resiliently held in position by a spring 119. The ball member 114 and holding member 118 retain the suction head resiliently in position under normal operating conditions. Should the suction head hit an obstruction the connection provided will permit it to be rotated about the ball 114 to clear the obstruction without breakage of parts. An air cylinder 120 is secured to the member 115 with a piston 121 therein. A hollow piston rod 122 extends through the lower end of the cylinder 120 and also through the piston 121. The lower end 124 of the cylinder rod is preferably ball shaped and has secured about it an article engaging member 125 with suction apertures 126 therein. Preferably the member 125 is held in position on the ball shaped end 124 by means of rings 127 held in position by the cover plate 128 bolted to the upper end of the member 125. A suitable arm 130 has a guide pin 131, which fits into a guideway 132 in an extension from the lower part of the air cylinder 120. The pins 131 and their cooperating parts prevent rotation of the suction heads about the supporting piston rod 122. The suction conduit 106 may be threaded to the upper end of the air cylinder 120 as shown at 106a. A spring 134 resiliently holds the piston 121 in its lower position. Normally, gravity is sufficient to lower the piston but in some instances it may become jammed to a slight extent. Hence, the spring is further assurance of a quick return of the suction head to its lower position when the conduit 106 and the upper end of the cylinder are opened to atmosphere.

It is to be noted that the suction head illustrated in Fig. 3a is the same as that illustrated in Fig. 9 with the exception that a suction conduit 107 is connected to the bottom of the air cylinder 120 below the piston at 107a in addition to the suction conduit 106 above the piston. This second suction connection is ordinarily not necessary as the spring 34 and gravity are sufficient to return the piston to its lower position. However, if desired, the valves 88 controlling the suction are adapted to supply suction to both ends of the air cylinder 120 and thereby positively move the piston in both directions. Pneumatic downward movement of the piston 121 may be desirable to facilitate engagement of the suction heads with certain types of ware.

A feature of the improved suction head described above is the automatic raising of the ware immediately that the suction head engages the ware. Referring to Fig. 9, when vacuum has been applied to the conduit 106 at the upper part of the air cylinder 120, the suction has no effect other than to draw in the atmosphere through apertures 126 and the hollow piston rod 122. The apertures 126 are sufficiently large to prevent the creation of an effective partial vacuum within the air cylinder. Immediately that the member 125 engages the bottom of the ware as shown in Figs. 3a and 8, the apertures 126 are closed and they can no longer play any part in relieving the effect of the suction on the air cylinder 120. The vacuum built up back of the piston 121 immediately raises the piston which raises the ware a short distance almost instantly upon engagement with the ware. The importance of this may be appreciated by reference to Fig. 8. Here the suction head 21 is shown removing a dish 22 from a support 4 on the holder 3 of a glazer conveyor. It will be seen that lateral movement of the dish 22 with respect to its support 4 is not possible until the dish has been raised. Therefore, an auxiliary movement supplementing the cam movement of the suction heads adds to the utility of the device. The fact that the suction head operates automatically to raise the ware upon engagement therewith eliminates the necessity for accurate timing and for accurate adjustments. The end 125 of the suction head being resiliently mounted about a ball will adjust itself readily to the bottom of the ware engaged.

The suction head illustrated in Fig. 10 is similar to that illustrated in Figs. 3a and 9, the principal difference being that the supporting rod 77a is threaded into a plate 115a closing the upper end of the air cylinder 120, omitting the ball and socket connection shown in Fig. 9. In this connection, the spring 134, shown in Fig. 9 is omitted and gravity is relied upon to return the suction head to its lower position. Where circumstances make it desirable, vacuum may be applied directly to the hollow support 77a or as described hereinbefore to the upper end of the cylinder at 106a.

Another form of ware holding device is illustrated in Fig. 11, which is particularly adapted to engage the rim of the ware or some projection on the ware to raise and transfer it where the bottom of the ware is not suitable for engagement by the member 125 of the preferred embodiment. The ball and socket connection between the rod 77 and the ware holder are the same as described above with reference to Fig. 9. The air cylinder 120a has at its lower end a pair of extensions 136 to which arms 137 are pivotally attached. The lower ends of the arms have ware engaging fingers 138 which are adapted to grip the rim of the ware. The air cylinder 120a has a piston 121a therein retained in its lower position by a spring 134. A piston rod 122a has attached to its lower end links 139 connecting it to the pivoted gripping members 137. When vacuum or suction is applied to the air cylinder 120a, piston 121a is raised and the links 139 are operated through the piston rod 122a to close the pivoted members 137 about the rim of the article. While the preferred form of suction head is illustrated in Fig. 9, the present type of gripper may be desirable for certain types of ware.

Referring again to Figs. 2 and 3a, it will be noted that the casting 92 carrying the cam 80 and the valve operating members 90 is keyed to the shaft 19 so that it does not rotate with the turret. In certain instances, it is desirable to adjust the cam 80 to vary the angular positions of the high and low points of the cam, for the purpose of varying the points at which ware is received and delivered by the transfer device. In order to facilitate such an adjustment there is provided adjacent the upper end of the shaft 19 a gear 140 (Fig. 13) keyed to the shaft 19 and meshing with a worm gear 141 on shaft 142 mounted in bearings 144. A hand wheel 145 on the end of shaft 142 is adapted to rotate the gear 140 and the shaft 19 to rotatably adjust the cam 80 with respect to the turret so that the position where ware is received and delivered may be changed. The gear 140 has a housing 146 which extends about it and is secured to shaft 19 and the bracing shafts 24.

Referring more particularly to Figs. 2 and 12, it will be noted that in some instances a conveyor 7 may deliver ware to the transfer device. Such conveyors have to be unusually wide to accommodate various sizes of ware. It is desirable that the ware be in a predetermined position so that the suction heads will engage the ware properly. Suitable stops 148 may be utilized to limit the movement of the ware in the direction of the movement of the conveyor. In order to fix the position of the ware in a lateral direction, the stop 148 has an extension 149 engaging the side of the ware. By oscillating the extension laterally of the conveyor, the position of the ware may be fixed both laterally and longitudinally of the conveyor. The preferred form of means for accomplishing this result is illustrated in Figs. 2, 3b and 12. The stop 148 is attached to a collar 150 pivotally held on the rotatable member 151 by a threaded member 154. The collar 150 is resiliently held in position by spring 155 attached to an extension 156 thereon at one end and to one of the vertical shafts 24 at its other end. Thus, the stop 149 is normally retained in its outer position laterally of the conveyor by the spring 155. The rotatable member 151 is keyed to the hollow member 27 and rotates the series of pins 157 secured in bearings 158 thereon and held in their downward position by springs 159. A stationary cam 160 bolted to the base 18 raises the pins 157 so that they engage, as shown in Fig. 3b, the member 150 to move the members 149 and 150 laterally, thereby to position the ware being received. The cam 160 has a drop at the position where it is desired to release the member 149 so that the pins 157 drop and the member 149 may be drawn back by the spring 159. In this way, the member 150 and the extension 149 are oscillated laterally. The cam 160 may be adjusted by means of the bolts 161 and the slot 162 to limit the lateral movement of the extension 149.

In the operation of the device, glassware may be delivered by a conveyor 147 (Fig. 2) to the suction heads 21. The stop 148 limits the movement of the ware by the conveyor. The lateral oscillation of the stop 148 and extension 149 by means of the cam 160, pins 157 and spring 155 positions the articles laterally of the conveyor so that they will be in the desired position in each instance. As an article reaches the proper position, a suction head 21 is lowered by the cam 80 and cam 40 roller 79 into engagement with the bottom or other surface of the article. At the time of the engagement suction is being applied to the head 21 through the conduit 106, air cylinder 120, rod 122 and apertures 126 in vessel engaging member 125. The suction becomes effective to hold the articles against the end of the suction head upon engagement therewith. Simultaneously, the closing of the apertures 126 causes a vacuum to build up in the air cylinder 120 which raises the piston 121 and the lower end 125 of the suction head. Thus, the article is immediately raised upon engagement therewith to remove it from the pocket of the supporting member and to cause it to clear any obstructions to lateral movement. Thereafter, the lateral movement of the suction head 21 by the turret 20 transfers the article to a suitable support which may be, for example, the support 4 on a conveyor for a glazer. At that point, the cam 80 has lowered the suction head to a point where the article is in engagement with or proximate to the support where it is to be deposited. Thereupon the vacuum line is open to atmosphere, which releases the article. In this manner, the several suction heads pick up and deposit ware as they rotate with the turret and are moved up and down by the cam 80. The source of suction connected to the hollow end 81 of the shaft 19 may be communicated to the air cylinders 120 through conduit 81, conduits 87, control valves 88 and conduits 103 leading to the air cylinders. The vacuum conduits 106 leading to the air cylinders 120 are opened alternately to vacuum and to atmosphere through the valve member 99 rotated by the star wheel 89. The pins 90 which operate the star wheels may be adjusted with respect to the stationary casting 92 by means of the hand wheel 94 and gear 95 meshing with gear teeth 96 on the ring supporting the pins 90. The position of the cam 80 which raises and lowers the suction heads may be adjusted as desired by means of the hand wheel 145 (Figs. 2 and 13). The latter is mounted on shaft 142 to rotate worm gear 141 meshing with gear 140 keyed to shaft 19 on which the stationary casting 92 is mounted.

The drive for the machine is preferably common to the drive of the glazer or other machine to which ware is being delivered or from which it is being removed. As shown herein the drive shaft 17 is operatively connected to the main drive shaft 8 by sprocket 15, chain 16, sprocket 14, and shafts 11 and 12. The worm gear 51 on shaft 17 drives the clutch shaft 34 through gear 50, bevel gear 52, gear 55, and bevel gear 54 keyed to shaft 34. The clutch shaft 34 has gears 30a, 31a and 32a meshing selectively with gears 30, 31, and 32 on the hollow member 27 which is operatively connected to the rotating turret. The clutch may be operated to drive the machine at any one of three speeds, the high speed preferably causes a suction head to register with each support 3 on the conveyor of a glazer, the next speed causes the suction head to register with each second support and the third speed causes a suction head to register with each third support. The phase relation of the suction heads and the ware support on the glazer may be adjusted by means of the hand wheel 65 (Fig. 4) which moves the gear 55, the plates 57 and 59. This varies the phase relation between shaft 46 and clutch shaft 34.

It will be seen that the present invention provides an improved article transferring device which is particularly applicable to the transfer of glassware. The articles are securely held by vacuum operated heads which do not exert sufficient pressure or strain to break the fragile ware. The ware is automatically raised in the preferred embodiment upon engagement of a suction head therewith. Such auxiliary movement renders the device particularly applicable to removal of ware from pockets and molds. The extent of the auxiliary movement can be any desired amount and the subsequent cam controlled movement can be any additional amount. Usually, the auxiliary movement is relatively slight and rapid in order to clear any obstruction and to permit rapid operation of the machine. Suitable adjustments are provided for various contingencies such as proper synchronization of the transfer device with other machines, change of the time of the application of vacuum and atmosphere at the suction heads, and change of the position for receiving and delivering articles. The device is simple in construction and easily operated with little or no attention from an attendant.

As various other changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In an article transferring device, the combination of a rotatable turret, a plurality of article engaging means adapted to engage the upper sides of the bottoms of dishes, devices for mounting said article engaging means on said turret including bendable joints, means for rotating said turret for transferring the engaged articles from one position to another, and automatic means responsive to the engagement of the article engaging means with an article for quickly raising the article auxiliary to the main movement thereof to cause the article to clear obstructions in the path of the main movement, said bendable joints being effective to prevent damage to the transferring device in the event of the failure of the raising means to raise the article.

2. In an article transferring device, the combination of a turret adapted to be rotated for transferring articles from one position to another, a plurality of suction operated article engaging means adapted to raise articles from pockets and to hold them while being transferred, said engaging means having an aperture adapted to be closed by the article engaged, auxiliary means responsive to the closing of said aperture to give the article a quick upward movement and devices for mounting said engaging means on the turret including bendable joints effective to prevent damage to the transferring device in the event the auxiliary means fails to operate.

3. In a transferring device of the class described, the combination of a turret adapted to be rotated to transfer articles from one position to another, a plurality of article engaging means for engaging and holding the articles, devices including a bendable joint for mounting said article engaging means on the turret, cam means for raising and lowering said article engaging means as the turret rotates, and auxiliary means for raising said article engaging means when it engages an article to clear an adjoining obstruction, said bendable joint being effective to prevent damage to the transferring device in the event said auxiliary means fails to operate.

4. In a transferring device of the class described, the combination of a turret adapted to be rotated to transfer articles from one position to another, a plurality of article engaging means adapted to engage the upper sides of the bottoms of dishes seated in pockets, devices for mounting said article engaging means on the turret including downwardly extending members having bendable joints, means for moving said article engaging means vertically during their movement with said turret, and auxiliary suction operated means automatically effective when an article is engaged to raise the article out of the pocket, said bendable joints being adapted to prevent damage to the transferring device in the event the auxiliary means fails to raise an article out of a pocket.

5. In a transferring device of the class described, the combination of a turret adapted to be rotated to transfer articles from one position to another, a plurality of suction heads mounted on said turret for engaging and holding the articles during transfer, valves on said turret for subjecting said suction heads to suction and atmosphere, devices for operating said valves, a plurality of members stationarily supported with respect to said turret for operating said devices, and means for adjusting the position of all of said members simultaneously.

6. In a transferring device of the class described, the combination of a turret adapted to be rotated to transfer articles to or from a machine having a series of removable article supports thereon, a plurality of article engaging means on said turret adapted to engage and hold articles, and means including a plurality of gears differing in size and a gear clutch adapted to engage said gears selectively for synchronizing the respective article engaging means on said turret selectively with each of said supports and with alternate supports whereby the several article engaging means will register with all or a part of the supports on the machine as they pass the turret to enable the machine to accommodate large articles by utilizing alternate supports.

7. In an article transferring device, the combination of a turret adapted to be rotated to transfer articles from one position to another, article engaging means mounted on said turret, pneumatic means for raising and lowering said article engaging means, a conveyor for delivering articles to said article engaging means, a stop for holding articles stationary in opposition to the movement of said conveyor, and means operatively connected to said turret to be moved thereby in a direction transverse to the movement of the conveyor for positioning said articles laterally on said conveyor for proper engagement with the article engaging means, whereby they may be lowered successively into engagement with positioned articles.

8. In an article transferring device, the combination of article engaging means for engaging and raising an article, a conveyor for delivering articles to said engaging means, a stop for limiting the movement of said articles in one direction in opposition to the movement of the articles by the conveyor, and oscillatory means for engaging and moving the articles laterally with respect to the conveyor accurately to position them for engagement by the article engaging means and a pneumatic cylinder for lowering said article engaging means into engagement with a positioned article and for raising said engaging means to raise the article.

9. In an article transferring device, the combination of a machine having transfer mechanism adapted to be lowered into engagement with articles to raise the same, an air cylinder for raising and lowering said transfer mechanism, a conveyor adapted to convey articles to said machine, a stop for limiting the movement of said articles in one direction and oscillatory means for moving the articles in a direction perpendicular to the movement of the conveyor for positioning the articles laterally with respect to said conveyor, whereby the articles are properly positioned for engagement by the transfer mechanism for raising and lowering articles.

10. In a device of the class described, the combination of a turret adapted to be rotated to transfer articles from one position to another, a plurality of suction operated articles engaging means, a plurality of pneumatic cylinders, means including members with bendable joints for suspending said cylinders from said turret, pistons in said cylinders, piston rods connecting said article engaging means to said pistons to raise said article engaging means to clear obstructions, and conduits connecting the upper parts of each cylinder respectively to the article engaging means operated thereby, said bendable joints being adapted to prevent damage to said transferring device in the event said pistons fail to raise the article engaging means.

11. In an article transferring mechanism, the combination of a turret adapted to be rotated, devices on said turret to engage and raise articles from a conveyor, an air cylinder for raising and lowering said devices, a conveyor for conveying articles to the turret, a stop for limiting the movement of the articles in the direction of the movement of the conveyor, a member resiliently retained in position and adapted to be moved transversely of the conveyor and rotary means adapted to move said resiliently retained member a predetermined distance transversely of the conveyor periodically to position the articles transversely thereon in position to be engaged and raised by said devices.

12. In an article transferring mechanism, the combination of a turret adapted to be rotated to engage and remove articles from a conveyor, a conveyor for conveying articles to the turret, a member resiliently retained in position and adapted to be moved transversely of the conveyor, rotary means having a series of retractable pins adapted to move said resiliently retained member transversely of the conveyor periodically to position the articles transversely thereon and means for retracting said pins to release said resiliently retained member to permit it to return to its normal position to be engaged by a succeeding pin.

13. In a transferring device of the class described, the combination of a turret adapted to be rotated to transfer articles from one position to another, a plurality of suction heads mounted on said turret for engaging and holding the articles during transfer, valves on said turret for subjecting said suction means to suction and atmosphere, devices for operating said valves, an annular ring stationarily supported with respect to said turret having members thereon for operating said devices, and means for changing the position of said ring to adjust the position of all of said members simultaneously.

14. In a transferring device of the class described, the combination of a turret adapted to be rotated to transfer articles from one position to another, a plurality of suction heads mounted on said turret for engaging and holding the articles during transfer, valves on said turret for subjecting said suction means to suction and atmosphere, devices for operating said valves, an annular ring stationarily supported with respect to said turret having members thereon for operating said devices, said ring having gear teeth thereon, and a manually operated gear meshing with said teeth for changing the position of said ring to adjust the position of all of said members simultaneously.

15. In a transferring device of the class described, the combination of a rotating turret having vertical guideways, supporting means mounted to move up and down in said guideways, a stationary cam effective to raise and lower said supporting means, a plurality of suction heads mounted on said supporting means for engaging and holding articles during transfer, valves on said turret for subjecting said suction heads to suction and atmosphere, devices for operating said valves, a plurality of members stationarily supported with respect to said turret for operating said devices, and means for adjusting the position of all of said members simultaneously.

16. In a transferring device, the combination of a rotating turret having vertical guideways, supporting members mounted in said guideways having cam rollers thereon, said supporting members depending from said turret, a stationary cam member effective upon said cam rollers to raise and lower said supporting members as the turret rotates, pneumatic cylinders, ball and socket means for pivotally connecting said pneumatic cylinders to said supporting members, said cylinders having pistons therein with piston rods extending beyond said cylinders and article engaging suction heads pivotally connected to said piston rods.

17. In a transferring device, the combination of a rotating turret having vertical guideways, supporting members mounted in said guideways having cam rollers thereon, said supporting members depending from said turret, a stationary cam member effective upon said cam rollers to raise and lower said supporting members as the turret rotates, pneumatic cylinders mounted on said supporting members having suction heads reciprocably mounted thereon for engaging and supporting articles during transfer, suction connections for operating said suction heads and said pneumatic cylinders, valves on said turret for controlling said suction connections, a plurality of members on said cam member for operating said valves, and means for adjusting the position of all of said valve operating members simultaneously.

18. A transferring device as claimed in claim 17, in which said suction heads are pivotally mounted.

19. In a transferring device, the combination of a rotating turret having vertical guideways, supporting members mounted in said guideways having cam rollers thereon, said supporting members depending from said turret, a stationary cam member effective upon said cam rollers to raise and lower said supporting members as the turret rotates, pneumatic cylinders mounted on said supporting members having pistons therein, suction heads mounted on said pistons for engaging and supporting articles during transfer, suction connections for operating said pneumatic cylinders and suction heads, valves on said turret for controlling said suction connections and means on said cam member for operating said valves.

20. A transferring device as claimed in claim 19, in which said pneumatic cylinders are pivotally mounted on the supporting members.

21. In an article transferring mechanism, the combination of a turret adapted to be rotated to engage and remove articles from a conveyor, a conveyor for conveying articles to the turret, a member adapted to be moved laterally of the conveyor, rotary means having a series of pins adapted to move said member laterally of the conveyor periodically to position articles on the conveyor and a stationary cam for controlling the movement of said pins into and out of engagement with said member to control the movement of said member.

22. In an article transferring mechanism, the combination of a turret adapted to be rotated to engage and remove articles from a conveyor, a conveyor for conveying articles to the turret, a member resiliently retained in position and adapted to be moved transversely of the conveyor, means having a series of retractable pins adapted to move said resiliently retained member transversely of the conveyor periodically to position the articles thereon, and means including a cam for retracting said pins to release said resiliently retained member to permit it to return to its normal position to be engaged by a succeeding pin.

WILLIAM L. McNAMARA.